United States Patent [19]

Petzetakis

[11] 4,172,748
[45] Oct. 30, 1979

[54] METHOD OF FORMING NON-WOVEN NET STRUCTURES

[75] Inventor: Nicholas G. Petzetakis, Athens, Greece

[73] Assignee: Hellenic Plastics and Rubber Industry N. & M. Petzetakis S.A., Athens, Greece

[21] Appl. No.: 858,334

[22] Filed: Dec. 7, 1977

[30] Foreign Application Priority Data

Dec. 13, 1976 [GB] United Kingdom ............... 51991/76

[51] Int. Cl.² .............................................. D04H 3/04
[52] U.S. Cl. ...................................... 156/177; 28/101; 156/178; 156/181; 156/439; 156/441
[58] Field of Search ............... 156/181, 178, 179, 177, 156/176, 441, 436, 439, 440, 322, 555, 320; 28/101, 102; 428/296, 107, 114, 295, 288

[56] References Cited

U.S. PATENT DOCUMENTS 3,029,179  4/1962  Wilson et al. .......................... 156/441
3,878,591  4/1975  Jense ..................................... 156/439
3,949,111  4/1976  Pelletion .............................. 156/181
4,080,232  3/1978  Friedrich ............................. 156/181

Primary Examiner—Michael W. Ball
Attorney, Agent, or Firm—Lawrence E. Laubscher

[57] ABSTRACT

A non-woven net structure is formed from initially-independent threads including a thermoplastic synthetic plastic material. The weft threads are located in axially-extending grooves in the surface of a rotatable cylinder. The warp threads are located in circumferentially extending grooves which may be in the surface of the same or a different cylinder. The threads are heated and are moved by cylinder rotation into intersecting relationship in a roller nip where pressure is applied to bond the threads at their intersections while the threads are in the grooves. The net structure may be bonded to or integrated with a thermoplastic synthetic plastic material in sheet form in the same operation. A subsidiary feature is a novel form of weft thread distributing apparatus.

19 Claims, 5 Drawing Figures

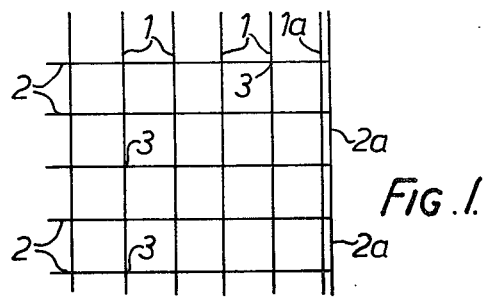
FIG. 1.
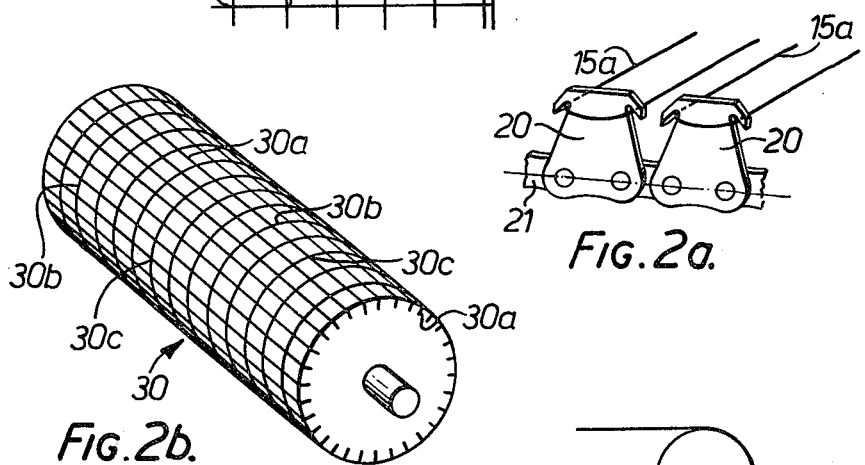
FIG. 2a.
FIG. 2b.
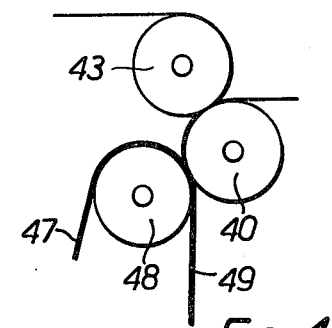
FIG. 4.
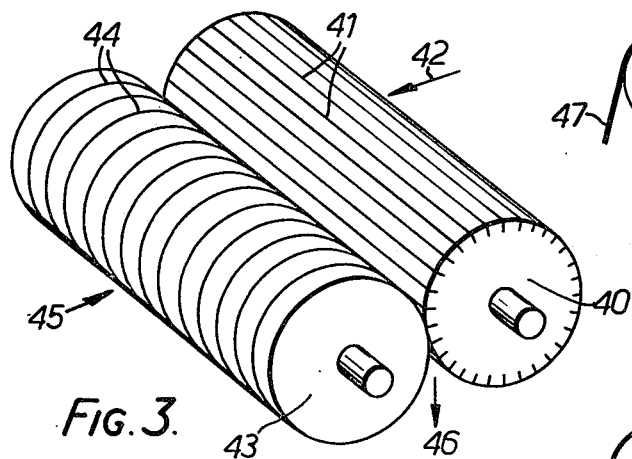
FIG. 3.
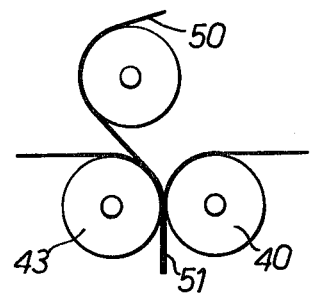
FIG. 5.

METHOD OF FORMING NON-WOVEN NET STRUCTURES

BRIEF DESCRIPTION OF THE PRIOR ART

This invention relates to non-woven net structures and articles incorporating such structures.

It is well known to produce non-woven fabrics constituted by a network of warp and weft threads adhesively secured together without interlacing of the threads. Such fabrics may be used, for example, as a reinforcement for sheets of material such as paper after being bonded thereto. The threads may be of various materials such as natural or synthetic fibres, including, for example, glass fibres and metallic fibres.

SUMMARY OF THE INVENTION

The objects of the present invention include the provision of improved methods and apparatus for the continuous production of non-woven net structures from threads of or comprising a thermoplastic synthetic plastic material. Also included are new articles of manufacture incorporating such structures.

According to one feature of the present invention there is provided a method of continuously producing a non-woven net structure from threads of or comprising a thermoplastic synthetic plastic material said net structure comprising mutually-spaced weft threads in intersecting relationship with mutually-spaced warp threads in which method the weft threads are applied successively to a rotatable cylinder and each weft thread is located in a respective axially-extending groove in the cylinder surface, the warp threads are simultaneously applied to a rotatable cylinder and each warp thread is located in a respective circumferentially-extending groove in and encircling the cylinder surface, the weft threads are moved by cylinder rotation into intersecting relationship with the warp threads, and the threads while remaining located in their respective grooves are subjected to sufficient pressure and heat to cause the synthetic plastic material of the threads to bond together at their intersections.

According to another feature of the invention, there is provided apparatus for continuously producing a non-woven net structure in accordance with the aforestated method, comprising a rotatable cylinder having in its cylindrical surface a series of axially-extending grooves corresponding to the weft threads of said net structure, a rotatable cylinder having in its cylindrical surface a series of circumferentially-extending grooves encircling the cylinder and corresponding to the warp threads of said net structure, a supply of weft threads and means for applying said threads successively to respective ones of said axially-extending grooves, a supply of warp threads and means for applying said threads to respective ones of said circumferentially-extending grooves whereby upon cylinder rotation the weft threads will be moved into intersecting relationship with the warp threads, and means for applying pressure to the thread intersections and means for applying heat to said intersections so that the threads are bonded together at their intersections while the threads remain located in their respective grooves.

A subsidiary feature of the invention is the provision of apparatus for distributing a weft thread on a weft conveyor frame.

BRIEF DESCRIPTION OF THE FIGURES

Other features of the invention, including novel products incorporating said features, will become apparent from the appended claims and from the following description of certain embodiments, given by way of example only, taken in conjunction with the accompanying drawings in which:

FIG. 1 is a plan view of a piece of a non-woven net structure according to the invention;

FIG. 2a is a detail, to an enlarged scale, from FIG. 2;

FIG. 2b is a perspective view of a grooved cylinder comprising part of the apparatus of FIG. 2;

FIG. 3 is a perspective view of an alternative embodiment of a feature of the invention; and FIGS. 4 and 5 are diagrams showing applications of the embodiment of FIG. 3.

DETAILED DESCRIPTION

Figure 2:
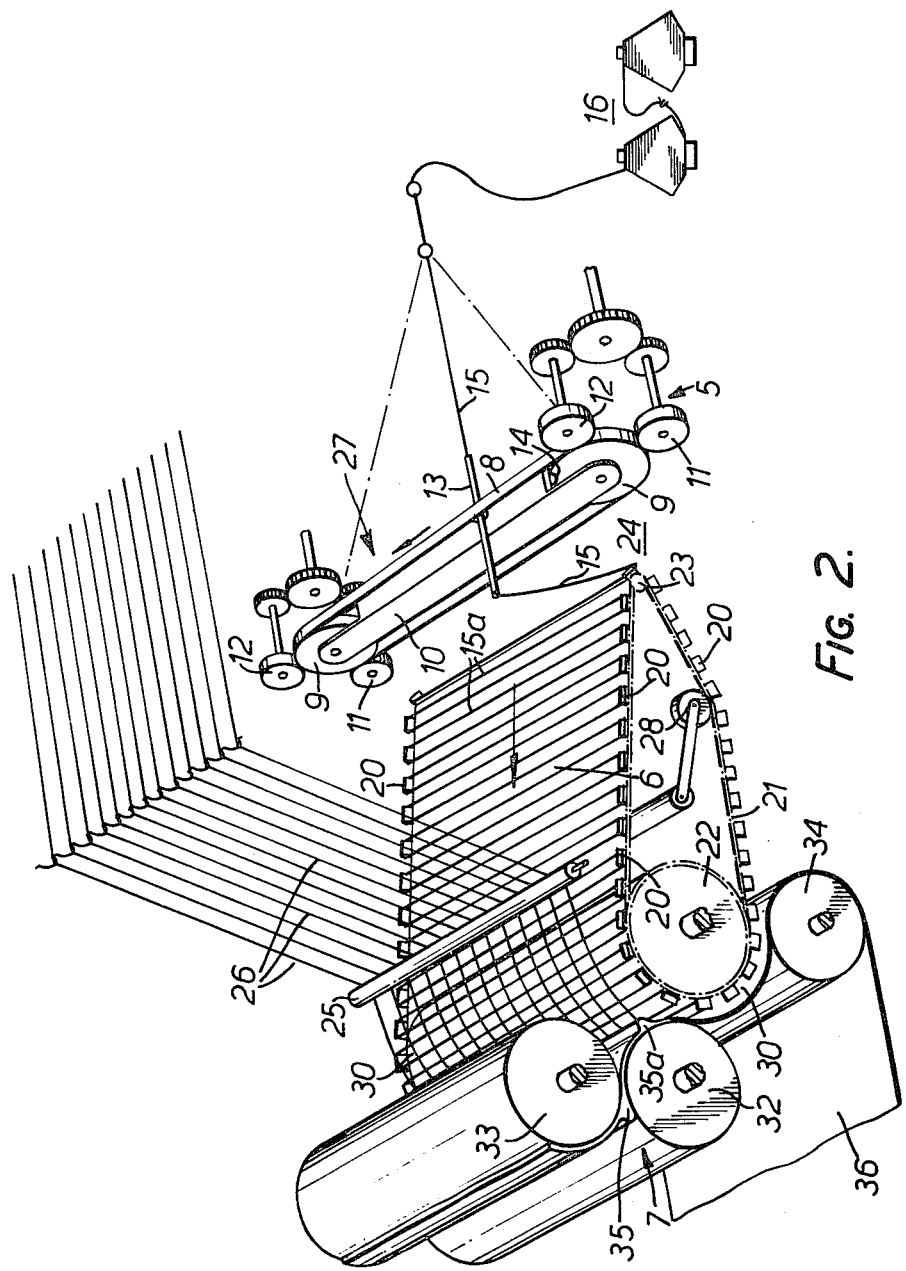
FIG. 2 is a diagrammatic perspective view of one embodiment of apparatus according to the invention.

Referring to FIG. 1, the invention provides a method and apparatus for continuously producing a non-woven net structure of predetermined width and indeterminate length consisting of warp threads 1 and weft threads 2. In the arrangement shown the threads lie at right angles to each other and intersect at points such as 3. All the warp threads overlie (or underlie) all the weft threads and there is no inter-weaving. The weft threads in this arrangement are all part of one continuous thread and edge return portions 2a of the weft (shown exaggerated) extend alongside each outermost warp thread such as 1a. The threads are either of a synthetic plastic material or constituted by a core of some other material pre-coated with a synthetic plastic material (e.g. expanded polyvinyl chloride) or, in the case of a multifilament thread, may be a combination of filaments of a synthetic plastic material and filaments of some other material. Such other material may be, for example, natural fibre, glass or metal. In any case the threads are such that they will bond to each other at the intersections 3 when subjected to appropriate degrees of pressure and heat. Where the net structure is to be incorporated in a sheet of synthetic plastic material (as described hereinafter), then by choice of appropriate synthetic plastic materials and by subjecting the materials to a calendering operation the thread and sheet materials will be caused to merge thereby creating a strong bond between them.

Various features of the invention will first be described with reference to a specific embodiment constituted by apparatus for producing a synthetic plastic sheet reinforced with such a non-woven net structure. This is shown generally in FIG. 2 and comprises a weft thread distributing apparatus referenced 5, a weft conveyor frame referenced 6, and a grooved cylinder 30 which, in this specific embodiment, constitutes one of the train of rollers of a calender machine generally referenced 7.

The thread distributing apparatus comprises a continuous belt 8 carried around two spaced pulley wheels 9 which are rotatably mounted one at each end of a rigid support member 10. This structure, consisting of the support member, pulley wheels and belt is supported at each end by drive means each comprising two drive wheels 11 and 12, the wheels 11 also supporting the weight of the structure and the wheels 12 restraining the structure against upwards or side-ways movement.

Thus, the structure floats between said drive means with the reaches of the belt extending horizontally. A thread-receiving guide member in the form of a tube 13 is secured to the internal surface of the belt, the ends of the tube being flared to facilitate the smooth passage of a thread through the tube.

Details of the belt and wheels 9, 11 and 12 are not shown but the internal surface of the belt incorporates toothed portions distributed along the whole surface which engage in corresponding teeth on the wheels 9, thereby retaining the belt accurately positioned in relation to said wheels (after the manner of the timing belt system used in certain automobile engines). Each pulley wheel 8 carries a co-axial gear wheel, preferably one each side, the teeth of which project beyond the pulley wheel surface to engage corresponding teeth on the drive wheels 11 and 12, sufficient space being left to permit free movement of the belt 8 between the respective wheels. A groove such as 14 is provided in each pulley wheel and associated gear wheels to receive the tube 13 as it passes around the pulley wheel.

Thus, as the shafts (indicated diagrammatically) of the drive wheels are rotated, the belt 8 is positively driven around the pulley wheels carrying the tube 13 which thereby is caused to reciprocate from one pulley wheel to the other. In the drawing, the upper reach of the belt is assumed to travel from right to left.

A thread 15 of or comprising a synthetic plastic material from a bobbin supply 16 (known per se) passes through the tube 13 and, due to the reciprocating motion of the tube, is caused to wind about guide plates 20 projecting from the weft conveyor frame 6. The guide plates are shown only diagrammatically but may, for example, take the form shown in FIG. 2a.

The weft conveyor frame comprises two endless drive chains 21 spaced apart by a distance corresponding to the desired width of the net structure, each chain being driven by a sprocket wheel 22 around an idler wheel 23 located at a thread-receiving station 24 which is traversed by the reciprocating tube 13. Each chain carries a continuous series of the guide plates 20, as indicated, which are located so that each guide plate on one chain is aligned with a corresponding guide plate on the opposite chain at least when the guide plates are moving away from the thread-receiving station 24, that is along the upper reaches of the drive chains 21. As the guide tube 13 is reciprocated across the thread-receiving station 24 the thread 15 is successively wound around opposite pairs of guide plates as these move through the thread-receiving station thereby laying weft threads 15a of the net structure across the weft conveyor frame. The weft threads are conveyed towards a warp beam 25 where warp threads 26 of or comprising a synthetic plastic material (supplied in any known manner) are introduced to overlie the weft threads to complete the thread combination of the net structure.

Thereafter, the thread combination passes onto the cylinder 30 the cylindrical surface of which is provided with a matrix of grooves extending axially and circumferentially of said surface in a pattern corresponding to that of the desired net structure (FIG. 1).

As seen in FIG. 2b, the axially-extending grooves 30a extend the whole length of the cylinder to emerge at the cylinder ends. The circumferentially-extending grooves 30b encircle the cylinder and are intersected at points such as 30c by all the axially-extending grooves 30a. Each of the grooves 30a and 30b has a similar U-shaped cross-section which preferably has a depth equal to the diameter of the corresponding thread and a width slightly greater than the diameter of said thread. The cylinder 30 is co-axial, and rotates, with the sprocket wheels 22. As the threads, moving forward from the location of the warp beam 25, arrive at the cylinder 30 the weft threads are located successively in respective axially-extending grooves 30a and the warp threads are located in respective circumferentially-extending grooves 30b. Thus, at the groove intersections 30c there will be a double thickness of thread and the overlying warp thread will project above the cylinder surface at these intersections. As the threads are subject to some degree of tension they are retained in their respective grooves as the cylinder 30 rotates to move them into a nip between the cylinder and a roller 32. As each weft thread is held within said nip its engagement with the respective guide plates 20 is released by means (not shown) which, for example, may cause the guide plates to withdraw from the weft thread or cut or melt the end of each weft thread adjacent the guide plates.

In the embodiment illustrated in FIG. 2 the cylinder 30 is shown as one roll of the calender machine 7, as is the roller 32. The train of calender rolls also includes rollers 33 and 34. A thermoplastic synthetic plastic material 35, (e.g. polyvinyl chloride) is supplied in a hot plastic state from an extruder (not shown) to the nip between the rollers 33 and 32 from where it is passed in sheet form to the nip between the roller 32 and cylinder 30. At the entrance to the latter nip a bank 35a of the thermoplastic material is created (in known manner) and the threads located on the cylinder 30 pass into this bank of material and are integrated with the sheet formed between the rollers 30 and 32. Thereby, each weft thread is bonded to, and secured in relation to, the intersecting warp threads. Further calendering occurs between the rolls 30 and 34, from which emerges a sheet 36 of the thermoplastic material 35 reinforced with an integral non-woven net structure.

The rolls of the calender machine 7 will be heated to appropriate temperatures, in accordance with well-known techniques in the art, including the cylinder 30. In some cases it may be appropriate to pre-heat the threads at or prior to their location on the cylinder 30.

If it is desired to produce only a net structure without a co-operating thermoplastic sheet, then the roller 32 and the cylinder 30 will be arranged to co-operate so as to provide sufficient pressure at their nip to cause the thermoplastics material of the weft and warp threads to bond together at their intersections so that the end product is a non-woven net structure per se.

In some applications of the invention it may be preferable for the warp threads to be located in grooves on one cylinder and the weft threads to be located in grooves on another cylinder. Such an arrangement is shown in FIG. 3 in which one cylinder 40 carries axially-extending grooves 41 for receiving weft threads arriving from the weft conveyor frame 6 in the direction of arrow 42 and another cylinder 43 carries circumferentially-extending grooves 44 for receiving warp threads arriving from the direction of arrow 45. At the nip between cylinders 40 and 43, appropriate pressure and heat is applied to cause the threads to bond at their intersections to produce a non-woven net structure which emerges in the direction of arrow 46. In this embodiment the depth of the grooves should be somewhat less than the diameter of the threads so that the intersections of the threads may be subjected to pressure in the nip between the cylinders 40 and 43.

This cylinder arrangement may be used for the production of a sheet of thermoplastic synthetic plastic material reinforced by a net structure. As seen in FIG. 4, weft threads located on cylinder 40 are bonded to warp threads located on cylinder 43 to produce a net structure emerging from the nip between the cylinders. A thermoplastic synthetic plastic material in sheet form 47 is supplied over a roller 48 which co-operates with the cylinder 40 so that sufficient pressure and heat is applied to the combination of sheet and net structure to cause them to bond together to produce a net-reinforced sheet 49. In an alternative embodiment shown in FIG. 5, a sheet 50 of thermoplastic synthetic plastic material is introduced between the warp and weft threads at the nip of the cylinders 40 and 43 producing a net-reinforced sheet 51 consisting of warp threads bonded to one surface and weft threads bonded to the other surface, the warp and weft threads thereby being bonded to each other (by way of the sheet 51) at their intersections.

Where the net structure is to be bonded to a thermoplastic synthetic plastic material in sheet form, the latter may be supplied to a calender machine as described directly from a sheet extruder or the material may be supplied in shots from an extruder and formed into a sheet by preceding rolls of the calender machine. In such cases the thermoplastic synthetic plastic material will already be in a highly plastic state suitable for bonding to the net structure. Alternatively the material may be supplied as a pre-formed sheet in which case the sheet will require appropriate heat treatment prior to being bonded to the net structure.

The present invention provides novel products in the form of non-woven net structures constituted by initially independent weft and warp threads which are accurately located in relation to each other and securely bonded to each other at their intersections. Additionally, the invention provides sheets of a thermoplastic synthetic plastic material reinforced with such net structures, either bonded to one or both surfaces of the sheet or integrated in the thickness of the sheet material.

I claim:

1. A method for continuously producing a non-woven net structure from threads at least partially formed from a thermoplastic synthetic plastic material, which net structure includes mutually spaced weft threads arranged in intersecting relation with mutually spaced warp threads, which comprises the steps of
   (a) applying the weft threads successively within axially extending grooves, respectively, contained in the circumferential surface of rotary cylinder means;
   (b) applying the warp threads within circumfentially-extending grooves, respectively, contained in and encircling the circumferential surface of rotary cylinder means;
   (c) rotating said cylinder means to bring the weft threads into intersecting relationship with the warp threads; and
   (d) subjecting the threads, while contained in their respective grooves, to sufficient heat and pressure to produce thermoplastic binding between the intersecting portions of said threads.

2. A method according to claim 1, in which the circumferentially-extending grooves are contained in the same cylinder surface as the axially-extending grooves, said bonding step being achieved by means of a roller which forms a nip which the intersecting weft and warp threads are moved by rotation of said cylinder means, and pressure is applied to the thread intersections in said nip.

3. A method according to claim 1, in which the axially-extending grooves are contained in the surface of a first cylinder, and the circumferentially-extending grooves are contained in the surface of a second cylinder, said cylinders cooperating to form a nip into which the weft and warp threads are in intersecting relationship in the nip, and pressure is applied to the thread intersections in said nip.

4. A method according to claim 2, in which a thermoplastic material in sheet form is additionally supplied to said nip, and further wherein the intersecting weft and warp threads are bonded to said thermoplastic material in the nip, thereby to produce a sheet of thermoplastic material reinforced by a non-woven net structure.

5. A method according to claim 3, in which a thermoplastic material in sheet form is additionally supplied to said nip between the weft and warp threads, said threads being bonded together at their intersections by way of the intervening thermoplastic material, thereby to produce a sheet of a thermoplastic material reinforced by a non-woven net structure.

6. A method according to claim 2, in which the non-woven net structure is subsequently bonded to a thermoplastic material in sheet form by the application of heat and pressure.

7. A method according to claim 4, in which the material is supplied directly from an extruder in a highly plastic state, whereby the threads become integrated with said material in the resultant sheet.

8. A method as claimed in claim 1, in which the weft threads are applied to the axially-extending grooves by conveyor means comprising a series of spaced-apart weft-receiving elements which are continuously moved through a thread-receiving station at which a thread drawn from a supply is reciprocated between the spaced-apart elements so as to engage an element at the end of each traverse, thereby to lay individual weft threads successively between said receiving elements.

9. A method as in claim 1, in which the weft threads are applied to the axially-extending grooves by conveyor means comprising series of spaced-apart weft-receiving elements which are continuously moved through a thread-receiving station where a thread drawn from a supply is reciprocated between the spaced-apart elements so as to engage an element at the end of each traverse, thereby to lay individual weft threads successively between said receiving elements.

10. Apparatus for continuously producing a non-woven net structure, comprising
   (a) first rotatable cylinder means including a circumferential surface containing a plurality of axially extending weft thread grooves;
   (b) second rotatable cylinder means including a circumferential surface containing a plurality of circumferential warp thread grooves encircling said surface;
   (c) means supplying weft threads to said axially extending weft thread grooves, respectively;
   (d) means supplying warp threads to said circumferential warp thread grooves, respectively, whereby upon rotation of said cylinder means, the weft threads are moved into intersecting relation with said warp threads each of said warp and weft threads at least partially including a thermoplastic material; and (e) means for applying pressure and heat to the thread intersections to bond together the intersecting thread portions while the threads are arranged within their respective grooves.

11. Apparatus according to claim 10, wherein said first and second cylinder means comprises a single grooved cylinder having in its surface both the axially-extending and the circumferentially-extending grooves, and a roller co-operating with said cylinder to form a nip therebetween constituting said means for applying pressure to said thread intersections.

12. Apparatus according to claim 11, comprising a calender machine incorporating said cylinder and said roller as calender rolls forming said nip.

13. Apparatus according to claim 12 comprising supply means for supplying a thermoplastic material in sheet form to said calender machine so that the material is passed through said nip and bonded to the net structure.

14. Apparatus according to claim 10, wherein said first cylinder means comprises a first cylinder having in its surface said axially-extending grooves, and said second cylinder means comprises a second cylinder having in its surface said circumferentially-extending grooves, said cylinders co-operating to form a nip therebetween constituting said means for applying pressure to said thread intersections.

15. Apparatus according to claim 14, comprising a calendar machine incorporating said first and second cylinders as calender rolls forming said nip.

16. Apparatus according to claim 10, and further comprising means for subsequently bonding the net structure by the application of pressure and heat to a thermoplastic material in sheet form.

17. Apparatus according to claim 10, and further including means for preheating the threads prior to them being bonded at their intersections.

18. Apparatus as claimed in claim 10, and further comprising weft-receiving elements spaced apart at a weft-receiving station by a distance corresponding to the desired width of the net structure, means for reciprocating a weft thread drawn from a supply from one element to the other so as to engage an element at the end of each traverse thereby to lay individual weft threads between the receiving elements, and means for continuously moving the weft threads away from said thread-receiving station and applying them to said axially-extending grooves.

19. Apparatus as claimed in claim 18, in which said means for reciprocating the weft thread comprises a plurality of toothed pulley wheels rotatably mounted in fixed and spaced relationship one at each end of a rigid support member, a continuous drive belt located around said pulley wheels and incorporating toothed portions distributed along the whole internal face of the belt adapted to engage the teeth of the pulley wheels and retain the belt accurately positioned in relation to said pulley wheels, respective drive means co-operating with each pulley wheel and located externally of the belt for both supporting and rotating the pulley wheels so that said belt moves around its path at a constant velocity and without slippage between the belt and either pulley wheel, and a thread-receiving guide member secured to said belt so that said member will move with the belt and thereby reciprocate from one pulley wheel to the other while the belt, together with said support member and pulley wheels, floats between said drive means.

* * * * *